Nov. 28, 1961  W. WALLACE  3,010,418
MARINE PIPELINE INSTALLATION
Filed April 22, 1959  4 Sheets-Sheet 1

William Wallace
INVENTOR
BY W.B.Harpman
ATTORNEY

Nov. 28, 1961 W. WALLACE 3,010,418
MARINE PIPELINE INSTALLATION
Filed April 22, 1959 4 Sheets-Sheet 3

INVENTOR
William Wallace
BY W. B. Harpman
ATTORNEY

Nov. 28, 1961    W. WALLACE    3,010,418
MARINE PIPELINE INSTALLATION

Filed April 22, 1959    4 Sheets—Sheet 4

William Wallace
INVENTOR
BY W. B. Hartman
ATTORNEY

United States Patent Office 3,010,418
Patented Nov. 28, 1961

3,010,418
MARINE PIPELINE INSTALLATION
William Wallace, South Murreys, Agates Lane,
Ashtead, England
Filed Apr. 22, 1959, Ser. No. 808,282
5 Claims. (Cl. 114—31)

This invention relates to marine pipeline installations. In harbours and ports, it is frequently necessary for pipelines to be extended between a ship and the shore. The pipelines may only have to extend a short distance, or they may, in order to better utilise the space available in a harbour, or in order to take advantage of a deeper water region, have to extend a considerable distance, for example several hundreds of feet. Wherever a ship is lying, it is likely to be necessary to pass a number of pipelines to it. Even a ship which is simply bunkering is likely to require at least three pipelines, one to carry heavy fuel oil for its furnaces, a second to carry light fuel oil for use in its lights and for cooking purposes, and a third pipeline carrying fresh water. Where the ship is an oil tanker which is either loading or discharging its cargo, at least one, and more likely several, pipelines will also be required for the bulk transfer of the cargo oil.

Where pipelines have to be extended from the shore to a ship which is lying even a very short distance from the shore, considerable difficulties are found to arise if the pipelines are to be directly extended between the ship and the shore. They have to be completely flexible and of a very strong construction, even to withstand the stress set up by their own weight. In addition, they have to be efficiently capped whilst they are being passed from ship to shore. They may easily be fouled by any other ship in the vicinity and movement of the ship relative to the shore may easily cause them to be strained or broken or may make them a hazard to small boats in the vicinity.

In addition, they are quite likely to get entangled with one another and after persistent use in this manner, may become undesirably fouled with weed. To avoid these disadvantages, it has sometimes been the practice to lay static pipelines upon the bed of the harbour, relatively short lengths of flexible piping extending from the ends of the static pipes to serve as connections to a ship. Such an arrangement is, however, inflexible, and when not in use the flexible pipes have to be securely capped and buoyed. Moreover, such installations represent a hazard from their buoy if a vessel should pass too close to them. In some ports it is required that a distance of about 200 feet be maintained between any moored buoy indicating or forming the terminus of a submarine pipeline system and the line of berth moorings; and this length of water has to be spanned by a floating pipeline or pipeband which must be retractable and flexible in order to be out of the way when a ship comes to moorings and also to allow for the sideways drift of the ship when the line or lines are coupled up. In addition, such relatively permanent installations, if carried too near the mooring berths, introduce problems when dredging has to be undertaken in their vicinity.

It is an object of the present invention to provide a pipeline installation which is not subject to these disadvantages.

According to the invention pipelines to extend between a ship and the shore or a buoy terminal are carried upon a floating structure comprising one or more raft sections. The structure may terminate in a large raft or barge for shipside operations.

The rafts may be of simple construction, and may be in the form of a longitudinally rigid framework structure including support means for one or a number of pipelines upon suitable buoyant pontoons. The framework structure of each raft may be an open girder-work structure of steel or other suitable material, to be supported a short distance above the water level. The sides of the framework may conveniently be of rigid structure and preferably extend outboard of the supporting pontoons to protect these from damage should the raft come into collision with another raft or with a vessel or the shore. The raft is preferably of considerable length, for example about fifty feet, and at each end the framework or a fender structure extends to an apex having an angle of about 90° or in a part circle. Where a number of rafts are to be connected together in end to end relationship, they may be connected by some form of universal joint at the apex or crown of the segments of the frames, and provided with restraining chains or lines connecting the outside members of the frames of the raft as a safeguard against jack-knifing of the raft sections.

In order to maintain a uniformity of length of the portions of flexible hose connecting the pipelines from raft to raft, the ends of the pipelines may lie in the same vertical plane. The pipelines may be carried on each raft in a vertical stack extending axially of the raft. The pipelines may each be rigidly mounted in suitable brackets or may be simply stacked on top of one another between retaining fences or retaining members disposed at suitable intervals along the length of the raft; or, alternatively, the lines may be carried flat on the deck of the raft for the greater part of their length and brought up at their ends by special pieces into the vertical plane axial with the raft. Either rigid metal or flexible hose lines may be mounted on the rafts, but in either case the ends must be brought into the same vertical plane. It will be appreciated that the rafts may carry any desired number or size of pipelines. Usually, however, each raft will carry two or three cargo lines for loading or unloading oil or other liquid cargoes from a tanker, one or two bunkering lines for refilling the ship with whatever grades of fuel it may require, and a fresh water line for recharging the ship's supplies of fresh water.

The raft is supported upon buoyant pontoons which may conveniently be sealed hollow metal structures. In order to reduce the resistance to the water of the pontoons, it is preferred that the raft should be supported upon two or more relatively small pontoons located at spaced positions along the length of the raft. By this means, a structure is provided which is much less affected by the force of a current or by the tidal movement of water or the movement of water arising from the passage of other vessels. By the use of pontoons, the submerged length of which is only a fraction of the length of the raft, the tension developed in the interconnections between the rafts and the connections between the rafts and the ship and the shore can be very much reduced. To still further reduce the tension which may be developed, the pontoons may be rotatable about a central axis and connected to the raft only through this axis.

By utilising an arrangement according to the invention, a ship-to-shore pipeline installation can be provided which is easily manipulated, which does not constitute a hazard to shipping, and which is convenient in use. The rafts may be of simple and cheap construction, but may be robust so that they will have a long life, with relatively no servicing. When the pipelines are to be connected, they can quickly and easily be extended by the use of a single hauling line and they may traverse a considerable distance without the use of specially strengthened or particularly expensive piping. When not in use, the rafts may be moored in lengths with the pipelines still connected so that they occupy very little harbour space and are ready for immediate use.

In order that the invention may be clearly understood, some embodiments thereof will now be specifically described by way of example only with reference to the accompanying diagrammatic drawings in which—

Figure 1:
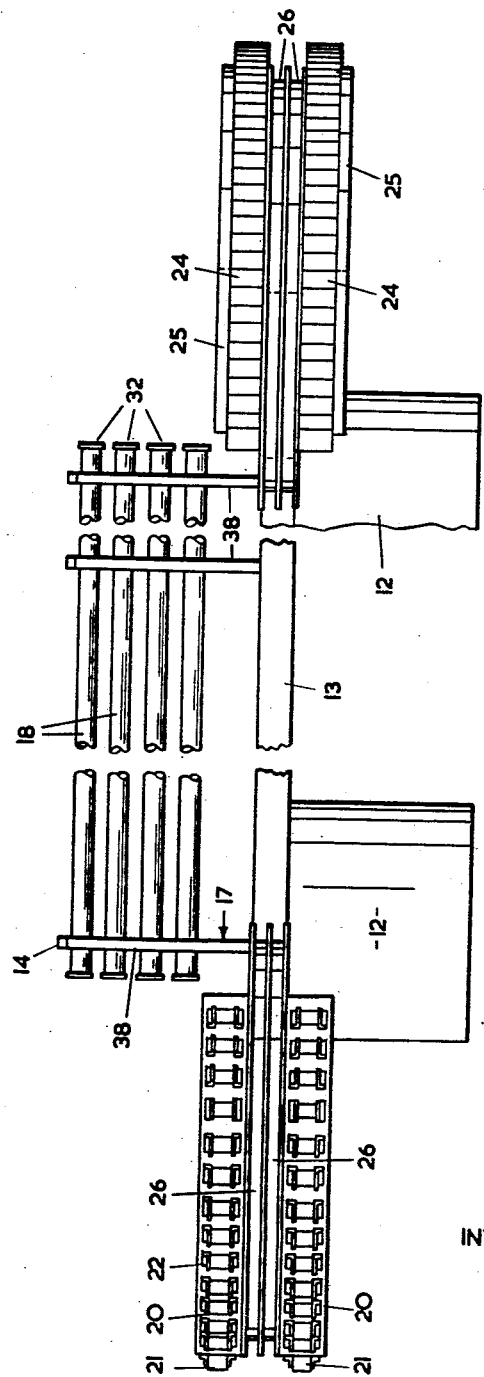
FIG. 1 shows a side elevation of a pipeline raft according to the invention.
Figure 2:
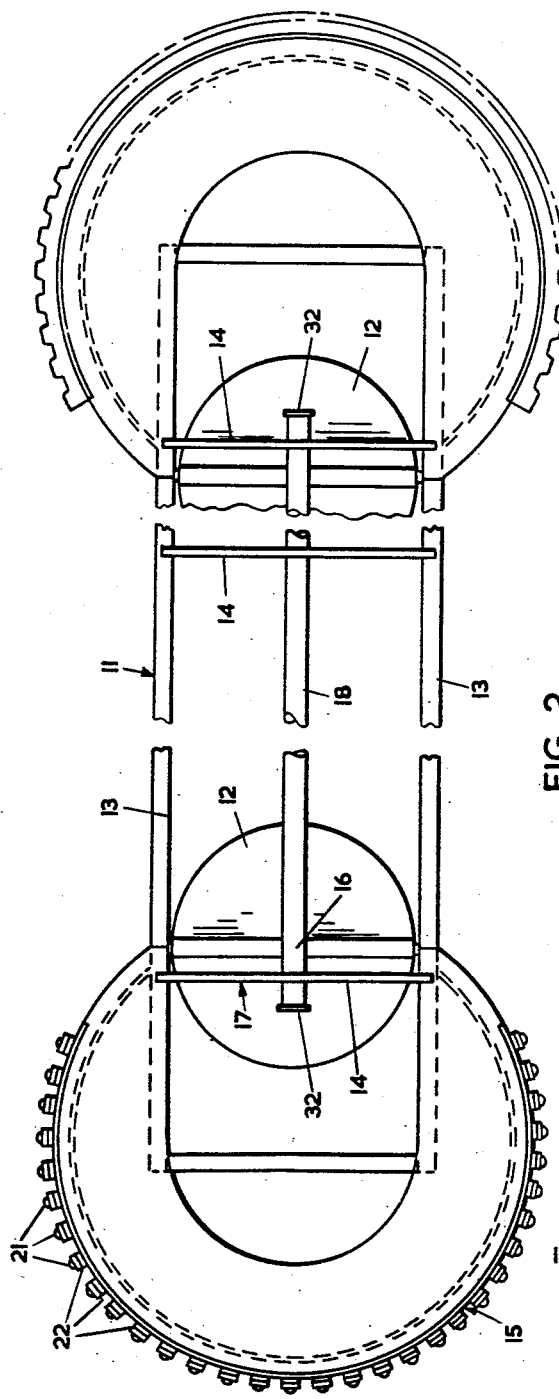
FIG. 2 shows a top view.
Figure 3:
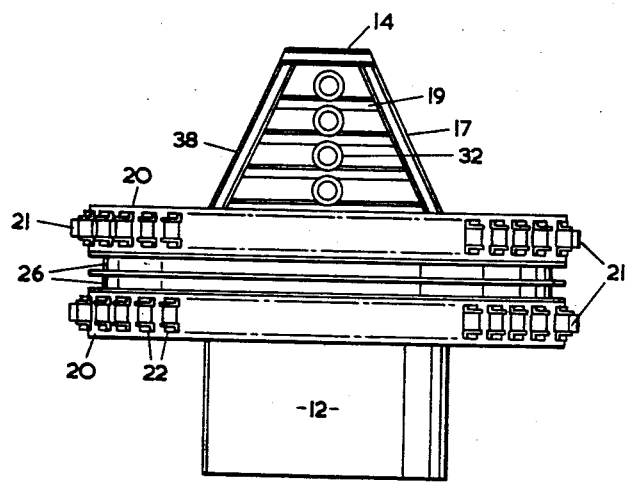
FIG. 3 is an end view of the raft illustrated in FIG. 1.

A raft according to the invention is made up of a framework 11 which may be from about thirty to fifty feet in overall length supported upon a pair of pontoons 12. The framework comprises a pair of parallel side members 13 interconnected and suitably braced at regular intervals along their length by cross members 14 and carrying upon their ends fenders 15 by means of which the rafts may be connected in end to end relationship. The entire framework may be constructed of relatively light weight steel girders bolted or riveted together and suitably protected against corrosion.

The framework 11 is supported upon two similar pontoons or buoys 12 of cylindrical shape. Each of these is a stout hollow sealed cylindrical metal vessel of suitable size, for example about eight feet diameter and six feet deep, the displacement of the buoys being sufficient to support the framework structure of the raft at a height of about one or two feet above the water level. Each of the pontoons 12 is rotatable about its central cylindrical axis 16, and is secured by suitable means to the framework with the central cylindrical axis 16 of the pontoon extending normally through the central longitudinal axis of the framework 11.

Pipeline supporting fences 17 extend upwardly from the framework 11 to support a number of pipelines 18 in a vertical stack upon the axis of the raft. The pipeline fences 17 comprise upright members 38 extending angularly upwardly to the bracing members 14 of the framework 11, carrying horizontal pipeline supports 19 which are recessed to locate the pipelines in a vertical stack on the longitudinal axis of the raft.

The side members 13 of the framework extend a short distance outboard of the pontoons 12 so as to protect these from damage in the event of collision between rafts or between the rafts and other vessels or harbour installations, and to prevent the pontoons from being restrained from free rotation by being positioned where they bear against an obstruction.

Figure 4:
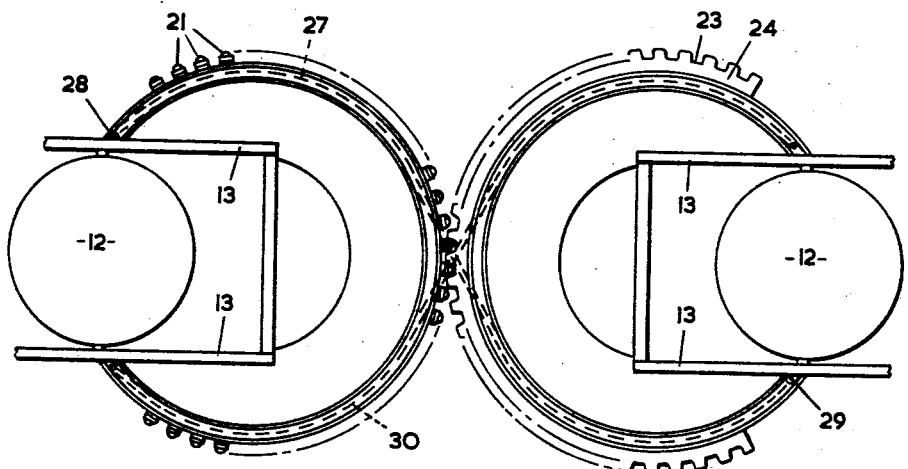
FIG. 4 is a detail in plan showing how adjoining rafts are secured together in end to end relationship.

The fenders 15 serve for the end to end connection of adjoining rafts in the manner shown in FIG. 4. The fender upon one end of one raft comprises a pair of rings or part circles 20 arranged one above the other on a common axis and carrying rollers 21 in suitable fittings 22 in a spaced relationship about the periphery of the circles. The spacing of the rollers 21 corresponds to the spacing of recesses 23 in a castellated ring 24 carried upon rings or part circles 25 corresponding to the rings 20 of the other raft end.

Between the rings 20 or 25 the ring ends are provided with a drum having a pair of channels 26 which serve to accommodate lashing chains or cables connecting the ends together. The arrangement of these chains or cables is shown in dotted lines in FIG. 4. A first cable 27 passes from a fastening 28 around one of the grooves 26 between the rings 20 and at the crown between the part circular fenders crosses tangentially to be carried in the corresponding groove upon the other fender between the rings 25 where it is anchored at 29. A second cable 30 passes in a similar manner in the other groove and in the opposite sense. By this means the rafts are coupled together and the rollers 21 are maintained in engagement with the recesses 23 whilst the rafts are free to pivot about the respective centres of the circles 20 and 25 relative to one another. If desired, a capping may be provided upon one of the raft ends to restrain the ends from undue relative vertical movement.

In order to allow for the angular movement between adjoining rafts, the ends 32 of the rigid pipelines carried upon each raft may be interconnected by flexible pipelines (not shown).

Figure 5:
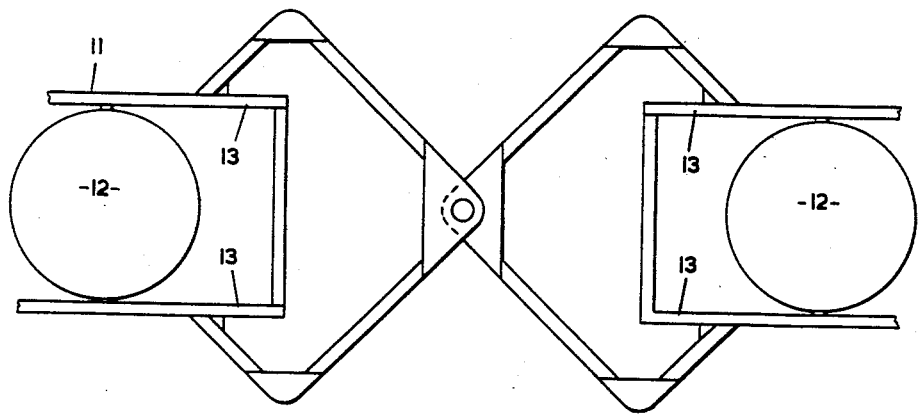
FIGURE 5 is a plan view showing another arrangement for securing the rafts together in end to end relationship.

It will be appreciated that many variations can be made in the construction of the rafts. For example, the pipelines may be carried upon the raft stacked between vertically extending fences, and where this arrangement is used the pipelines may either simply be stacked on top of one another or alternatively may be separated by spacing blocks which may be keyed to slide on the fences. Other considerable changes may be made in the manner in which adjacent rafts are connected together in end to end relationship. For example, a similar construction to that which has been specifically described may be used in which the rings or part circles which interengage are not provided with corresponding interengaging formations but are simply rings of a suitable material which rest in contact with one another. Alternatively, a similar form of ring structure may be used which is arranged so that the ring structure upon one end of one raft fits inside the ring structure upon the adjacent end of the next raft, so providing a swivel joint about a common centre of the two part-circular ends. Alternatively, as in FIGURE 5 the framework of the raft may be brought to a point or apex having an angle of approximately 90° located on the axis of the framework and a raft connection may be provided at this apex so that a suitable pivot, flexible or universal joint may be used to interconnect the adjoining rafts. In this case, safety chains or ropes may additionally be provided to safeguard against the breakage or disengagement of the joints.

I claim:

1. A marine pipeline installation comprising a plurality of raft structures, means upon each of said raft structures to support a number of pipelines and buoyant pontoons beneath each of said raft structures to support the same, a part circular fender upon each end of each of said raft structures and a drum concentric with each fender, flexible connecting means to connect a raft structure in end to end relationship with an adjacent raft structure with the fenders of adjacent raft structures in abutment, said flexible connecting means passing part of the way around said drum and crossing tangentially to pass part of the way around the drum of said adjacent raft structure.

2. A marine pipeline installation as set forth in claim 1 and wherein vertical fence-like structures are positioned on each of said raft structures whereby said pipeline may be carried in a vertical stack extending axially of each of said raft structures.

3. The marine pipeline installation set forth in claim 1 and wherein a number of pipelines are positioned on each of said raft structures having the greater portion of their length flat on the decks of said raft structures and are brought up at their ends into the vertical axial plane of said raft structure.

4. The marine pipeline installation comprising the plurality of raft structures set forth in claim 1 and wherein each of said raft structures has a part circular fender on each end thereof and wherein one of the fenders of each raft structure carries a plurality of rollers at equal circumferential spacing about its periphery, and the other fender on said raft structure is castellated, the recesses of the castellations being of substantially the same size and at the same spacing as said rollers.

5. The marine pipeline installations set forth in claim 1 and wherein each of said raft structures is brought to a point at its opposite ends and wherein said part circular fenders are positioned at the apex of said points.

References Cited in the file of this patent

UNITED STATES PATENTS

| | | |
|---|---|---|
| 410,801 | Miller | Sept. 10, 1889 |
| 417,187 | Humphreys | Dec. 10, 1889 |
| 1,765,405 | De Long | June 24, 1930 |
| 2,107,886 | Creed | Feb. 8, 1938 |